United States Patent
Doyle

(10) Patent No.: US 10,577,450 B2
(45) Date of Patent: Mar. 3, 2020

(54) STORAGE STABLE ACTIVATED PREPOLYMER COMPOSITION

(71) Applicant: Chemtura Corporation, Middlebury, CT (US)

(72) Inventor: Thomas R. Doyle, Wallingford, CT (US)

(73) Assignee: LANXESS Solutions US Inc., Shelton, CT (US)

( * ) Notice: Subject to any disclaimer, the term of this patent is extended or adjusted under 35 U.S.C. 154(b) by 0 days.

(21) Appl. No.: 15/269,059

(22) Filed: Sep. 19, 2016

(65) Prior Publication Data

US 2017/0088660 A1 Mar. 30, 2017

Related U.S. Application Data

(60) Provisional application No. 62/232,496, filed on Sep. 25, 2015.

(51) Int. Cl.
| | |
|---|---|
| *C08G 18/10* | (2006.01) |
| *C08G 18/08* | (2006.01) |
| *C08G 18/32* | (2006.01) |
| *C08G 18/16* | (2006.01) |
| *C08G 18/79* | (2006.01) |
| *C08G 18/44* | (2006.01) |
| *C08G 18/12* | (2006.01) |
| *C08G 18/34* | (2006.01) |
| *C08G 18/38* | (2006.01) |

(52) U.S. Cl.
CPC ......... *C08G 18/0809* (2013.01); *C08G 18/10* (2013.01); *C08G 18/12* (2013.01); *C08G 18/168* (2013.01); *C08G 18/3206* (2013.01); *C08G 18/3243* (2013.01); *C08G 18/3268* (2013.01); *C08G 18/34* (2013.01); *C08G 18/3823* (2013.01); *C08G 18/44* (2013.01); *C08G 18/792* (2013.01)

(58) Field of Classification Search
CPC .............. C08G 18/168; C08G 18/3243; C08G 18/3268; C08G 18/44; C08G 18/792
See application file for complete search history.

(56) References Cited

U.S. PATENT DOCUMENTS

| | | | |
|---|---|---|---|
| 3,755,261 A | 8/1973 | VanGlick | |
| 3,876,604 A | 4/1975 | Caruso et al. | |
| 3,888,831 A | 6/1975 | Kogon | |
| 3,936,409 A * | 2/1976 | Schroeder | C08G 18/10 524/104 |
| 4,046,743 A | 9/1977 | Schonfeld | |
| 4,282,344 A | 8/1981 | Caruso | |
| 4,517,331 A | 5/1985 | Parker et al. | |
| 4,525,568 A * | 6/1985 | Chang | C08G 18/10 156/331.4 |
| 4,772,676 A | 9/1988 | Koch et al. | |
| 4,990,545 A * | 2/1991 | Hourai | B29C 61/003 427/261 |
| 8,754,184 B2 | 6/2014 | Doyle et al. | |
| 9,006,375 B2 | 4/2015 | Doyle et al. | |
| 2007/0213497 A1* | 9/2007 | Nagaraj | C08G 18/0895 528/44 |
| 2008/0064844 A1* | 3/2008 | Nagaraj | C08G 18/12 528/59 |

OTHER PUBLICATIONS

PCT International Search Report and Written Opinion dated Nov. 25, 2016 from corresponding Application No. PCT/US2016/052456, 9 pages.

* cited by examiner

*Primary Examiner* — Michael L Leonard

(57) ABSTRACT

The addition of a small amount of an alkyl sulfoxide, e.g., DMSO, to an isocyanate capped prepolymer provides a storage stable prepolymer composition in which the prepolymer is also highly activated towards curing with certain blocked curing agents such as methylenedianiline metal salt coordination complexes. The prepolymer/alkyl sulfoxide compositions are cured by said blocked curing agents at lower temperatures and/or at an accelerated rate compared to similar compositions lacking the alkyl sulfoxide providing high performance polyurethane elastomers.

2 Claims, No Drawings

STORAGE STABLE ACTIVATED PREPOLYMER COMPOSITION

This application claims priority to U.S. Provisional Application No. 62/232,496, filed Sep. 25, 2015, the disclosure of which is incorporated herein by reference.

Compositions comprising isocyanate capped prepolymers and small amounts of alkyl sulfoxides, e.g., DMSO, are surprisingly both exceptionally storage stable and highly activated towards curing with certain blocked curing agents, e.g., methylenedianiline metal salt coordination complexes, which compositions are cured by said blocked curing agents at lower temperatures and/or at an accelerated rate to provide, e.g., high performance polyurethane elastomers.

BACKGROUND OF THE INVENTION

Preparation of polymers that are formed by curing or crosslinking a resin or prepolymer, e.g., the curing of an epoxy resin or polyurethane prepolymer, is conceptually simple and in many cases straightforward. However, when preparing high performance materials and articles, such as high performance polyurethane elastomers, balancing the need for quick and efficient curing with the time needed to properly process the prepolymer/curative composition before curing occurs can be problematic. Often, factors that provide a stable, easily handled and stored material tend to diminish the reactability of the system leading to longer cure times. Balancing these needs can become more difficult when there is a need to store and/or handle the reactive prepolymer and curative together for extended periods of time without causing unwanted reaction, degradation or loss of activity.

Curing or crosslinking polymer resins and prepolymers, such as epoxy resins, isocyanate-terminated polyurethane prepolymers and the like, with di-amines, tri-amines and other polyamines is well known. For example, a polyfunctional amine, e.g., bis orthochloroaniline (MOCA), methylene bis diethylaniline (MDEA), 4,4'-methylenedianiline (MDA), etc., can be mixed with a resin or prepolymer, the mixture can then be cast into a mold or onto a surface etc., and heated to complete the curing reaction. In some applications problems have arisen due to premature reaction of the curing agent with the resin or prepolymer during mixing, casting, or other processing step.

U.S. Pat. Nos. 3,755,261, 3,876,604 and 4,282,344 disclose the cure of amine curable polymers using as the curing agent co-ordination complexes formed between polyamines and alkali metal salts rather than the free amine. For example, the coordination complex of NaCl and 4,4'-methylenedianiline rather than free 4,4'-methylenedianiline can be added to an isocyanate capped prepolymer to affect cure. It is usually necessary to liberate or de-block the free amine, e.g., 4,4'-methylenedianiline, from the coordination complex, typically by heating, before it can effectively cure the resin or prepolymer.

The most commonly encountered coordination complex curing agents are alkali metal salt complexes with MDA, also called MDA-CC, for example, a 3:1 NaCl:MDA complex. Isocyanate capped prepolymers have been cured with this curative, or a similar blocked curative, to give high performance elastomeric materials.

Mixing MDA-CC with polyurethane prepolymers at temperatures below the deblocking temperature form curing compositions that often have long pot lives, which can be up to a year or more depending on the system and storage conditions. Heating the curing compositions above the decomposition temperature of the MDA-CC releases the highly active MDA, which reacts with the prepolymer to form elastomeric products. This method has been successful in many instances, including commercial 'one pack' polyurethane systems, but improvements are still needed. For example, in some cases deblocking and curing is sluggish, requiring the use of higher than desirable temperatures or overly long cure times. As a result, catalysts or cure accelerators are used in some applications to lower the MDA-CC deblocking temperature, allowing processors to use lower molding temperatures and increase productivity by decreasing the molding cycle time.

Added difficulties can arise in some applications, such as in the production of thicker films or articles, where non-uniform curing can occur due to rapid MDA-CC de-blocking and prepolymer curing at the surface of the heated mold, while the interior section of the composition cures more slowly or incompletely. This can result in a polyurethane elastomer lacking a consistent or uniform structure. For example, a hard skin may first form on the outer surfaces and, as the cure proceeds, the skin may rupture, resulting in an undesirable cracked surface.

Cure accelerators are catalytic compounds useful in accelerating the deblocking of blocked curatives, typically by lowering the temperatures needed for deblocking. Many such materials, e.g., glycerol and urea, have been developed for use in curing polyurethanes. However, the performance demonstrated by known cure accelerators leaves much room for improvement, and many of these catalysts may work only with certain prepolymer/curative combinations.

U.S. Pat. No. 3,888,831 discloses the curing of amine-curable polymers or prepolymers with a salt complex of methylenedianiline in association with a polar or polarizable compound, e.g., an ester, a ketone, an ether, an aromatic hydrocarbon, a halogenated hydrocarbon, a tertiary amine, a sulfone, a sulfoxide, or a sulfide. Acetone and esters of tetra-ethylene glycol are preferred. Nitrobenzene, xylene, chlorobenzene, tetra-ethylene glycol bis-2-ethyl hexanoate and dipropylene glycol dibenzoate are exemplified.

U.S. Pat. No. 4,046,743 discloses the use of a MDA complex as a curing agent of amine curable polymers or prepolymers in the presence of a high dielectric constant catalytic compound such as tributyl phosphate.

U.S. Pat. No. 4,517,331 discloses curing a polypropylene ether glycol prepolymer using a complex of MDA in the presence of a pseudocrown ether. U.S. Pat. No. 4,772,676 discloses the use of alcohol catalysts, such as, 1,4-butane diol or phenoxypoly(oxyethylene) ethanol, to effect ambient temperature cure of urethane prepolymers or polymers with a methylenedianiline (MDA) salt complex.

U.S. Pat. Nos. 8,754,184 and 9,006,375 disclose accelerating the cure rate of a polyurethane prepolymer with a methylenedianiline metal salt coordination complex by adding a nitrogen-containing organic salt, e.g., an imidazolium, pyridinium, pyrrolidinium, piperidinium, or morpholinium salt, to the prepolymer before reaction with the methylenedianiline metal salt coordination complex chain extender.

Despite the generic disclosure of such a wide range of compounds as cure accelerators, many of these compounds, or classes of compounds, have never been exemplified in a polyurethane curing composition with a polyamine coordination complex. In many cases, little is known about the impact the presence of these compounds may have on storage stability of the prepolymer or curative, and in some cases the disclosed cure accelerators are known to be detrimental to the stability of the prepolymer.

The ideal cure accelerator should 1) be compatible with the prepolymer, curing agent, and a mixture of prepolymer and curing agent, 2) would not initiate any reaction until the final curing composition is heated to the activation temperature, and then 3) at that temperature cure would be quick and consistent throughout the composition. Many known cure accelerators fall short of these criteria. For example, recent tests run by the present inventor, and reported herein, show that some of the disclosed accelerators are relatively ineffective under certain conditions and many have a negative impact on the storage stability of the prepolymer.

Thus the need exists for improved accelerators for use in the formation of polyurethanes by reaction of prepolymers with blocked curatives, especially for use with coordination complexes of metal salts and polyamines, in order to increase productivity and to produce high performance polyurethane elastomers with substantially uniform consistency.

It has been surprisingly found that alkyl sulfoxides, such as DMSO, butyl sulfoxide, ethyl butyl sulfoxide etc., not only form stable compositions with prepolymers that can be stored without degradation or loss of activity, but the presence of the sulfoxides also have exceptionally high catalytic activity relative to other disclosed cure accelerators in deblocking of MDA co-ordination complexes, and the curing of polyurethane prepolymers. Whereas prepolymer stability and catalytic activity are typically inversely related, it has been found that the inclusion of a small amount of alkyl sulfoxide, e.g., dimethyl sulfoxide, in an isocyanate capped polyurethane prepolymer composition, results in an exceptionally stable composition with unexpectedly high curing efficiency when cured with a polyamine coordination complex such as a co-ordination complex of NaCl and 4,4'-methylenedianiline.

SUMMARY OF THE INVENTION

The present invention provides a storage stable composition comprising an isocyanate capped polyurethane prepolymer and from about 0.1 to about 5.0 wt %, typically 0.1 to 2 wt %, e.g., 0.1 to 1.5 wt % or 0.25 to 1.5 wt % of an alkyl sulfoxide, based on the combined weight of the prepolymer and alkyl sulfoxide, e.g., DMSO, butyl sulfoxide, ethyl butyl sulfoxide etc., which composition is more effectively cured, e.g., cured in a shorter period of time, more uniformly, and/or at lower temperature, by a polyamine metal salt co-ordination complex, e.g., methylenedianiline metal salt coordination complex, due to the action of the alkyl sulfoxide.

Alkyl sulfoxides of the invention, e.g., DMSO, are more active as deblocking agents and catalysts for curing agents, such as metal salt co-ordination complexes of methylenedianiline, than many other known accelerators, and also form more stable compositions with polyurethane prepolymers. For example, prepolymer/amine co-ordination complex compositions comprising a small quantity of alkyl sulfoxide according to the invention cure in a shorter time and/or at lower temperatures than similar prepolymer/amine co-ordination complex compositions lacking the alkyl sulfoxide, and produce polyurethane elastomers with excellent physical properties.

Also provided is a process for accelerating the cure of an isocyanate capped polyurethane prepolymer by a polyamine metal salt co-ordination complex curing agent either by adding an alkyl sulfoxide to the prepolymer or the curing agent prior to mixing the prepolymer and curing agent, or by adding the sulfoxide to a mixture comprising the prepolymer and curing agent, and then heating the resulting composition to effect cure.

Also provided is a polyurethane polymer produced from such a composition or process, e.g., an elastomeric or thermoplastic polyurethane, and a sheet or molded article comprising the polyurethane polymer. One particular embodiment provides a thick section polyurethane elastomer or article comprising the elastomer produced using the composition or process of the invention, i.e., an elastomeric polyurethane film, sheet or molded article having a thickness of 0.5 mm or more, 1 mm or more, 2 mm or more, in some embodiments 5 mm or more or 10 mm or more, which elastomer has consistent cure throughout the entire section.

One embodiment provides a method of preparing a polyurethane elastomer comprising the steps of i) preparing a prepolymer composition comprising an isocyanate terminated prepolymer and from about 0.1 to about 5.0 wt %, typically 0.1 to 2 wt %, e.g., 0.1 to 1.5 wt % or 0.25 to 1.5 wt % of an alkyl sulfoxide ii) combining the prepolymer composition of step i) with a polyamine metal salt coordination complex, e.g., a methylenedianiline metal salt coordination complex, to form a curable composition, and iii) heating the curable composition to effect cure.

The alkyl sulfoxide can also be added to a composition comprising an MDA-CC curative and prepolymer without causing premature deblocking of the curative. Curatives are also referred to in the art as cross-linkers or chain extenders.

One embodiment provides compositions comprising an isocyanate capped polyurethane prepolymer and an alkyl sulfoxide wherein the composition contains no curing agent, e.g., no amine/metal salt coordination complex curing agent; other embodiments provide compositions comprising an isocyanate capped polyurethane prepolymer, an alkyl sulfoxide and a polyamine metal salt co-ordination complex, e.g., a metal salt co-ordination complex of a di-amino aromatic compound, such as a methylenedianiline metal salt coordination complex.

The composition of the invention can therefore be sold and stored as a composition comprising the sulfoxide and either a prepolymer, a MDA CC curative, or both prepolymer and curative, simplifying commercial casting operations and eliminating the need for a separate catalyst stream when using machine mixing.

DESCRIPTION OF THE INVENTION

One broad embodiment of the invention provides a composition comprising an isocyanate capped polyurethane prepolymer and from about 0.1 to about 5.0 wt %, typically 0.1 to 2 wt %, e.g., 0.1 to 1.5 wt % or 0.25 to 1.5 wt % of an alkyl sulfoxide, based on the combined weight of the prepolymer and alkyl sulfoxide.

The composition is both storage stable, i.e., it can be prepared and stored under typical industrial or commercial conditions without degradation of physical or chemical properties of the prepolymer, and is activated for more effective curing of the prepolymer when reacted with a polyamine metal salt coordination complex, such as methylenedianiline metal salt coordination complex, than when the prepolymer is cured in the absence of the alkyl sulfoxide. More effective curing as used herein means that the curing takes place in a shorter period of time, occurs at a lower temperature, and/or results in a more uniformly cured polyurethane product than otherwise obtained.

The alkyl sulfoxide cure accelerators of the invention are well-known compounds of the formula:

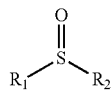

wherein $R_1$ and $R_2$ and independently selected from alkyl groups having from 1 to 12, e.g. 1 to 6 carbon atoms, and in some embodiments $R_1$ and $R_2$ together with the sulfur atom may form a 5 to 7 member ring. In many embodiments of the invention the sulfoxide is not cyclic, i.e., $R_1$ and $R_2$ together with the sulfur atom do not form a 5 to 7 member ring, and $R_1$ and $R_2$ are selected from $C_{1-6}$ alkyl groups, e.g., methyl, ethyl, propyl and butyl. For example, the commercially available dimethyl sulfoxide has been used with great success.

Isocyanate capped urethane prepolymers of the invention are formed by reaction of one or more polyisocyanate monomers, e.g., diisocyanate monomers, with one or more polyols, e.g., diols. Such prepolymers, many of which are commercially available, and methods for their preparation are well known in the art. There is no particular restriction on the prepolymer, or mixture of prepolymers, that can be used in the present invention, nor is there a particular restriction on the polyols or isocyanate monomers that can be used in the preparation of the prepolymers.

Polyols used in the preparation of the prepolymers, for example, may comprise an alkane polyol, polyether polyol, polyester polyol, polycaprolactone polyol and/or polycarbonate polyol. Such polyols are well known in the art and more than one may be used. The term "comprise a", "comprise an" and the like means that one or more than one may be present. For example, in some embodiments the polyol comprises one or more polyether polyol, polyester polyol, polycaprolactone polyol and/or polycarbonate polyol. In many embodiments, prepolymers prepared from diols are preferred over those formed from triol or higher polyols.

Polyether polyols include, e.g., polyalkylene ether polyols having the general formula $HO(RO)_nH$, wherein R is an alkylene radical and n is an integer large enough to provide the desired MW, e.g., a number average molecular weight of 200 to 6,000, e.g., from 400 to 3000 or from 1000 to 2500. Such polyalkylene ether polyols are well-known and can be prepared by the polymerization of cyclic ethers such as alkylene oxides and glycols, dihydroxyethers, and the like. Common polyether diols include, polyethylene ether glycols, polypropylene ether glycols, polytetramethylene ether glycols, mixed ether diols, such as ethylene glycol/propylene glycol ether copolymer diols, end capped polyether diols such as EO-capped polypropylene glycol, and the like.

Polyester polyols include, e.g., reaction products of adipic acid, succinic acid, isophthalic acid and other difunctional or multifunctional carboxylic acids with glycols, such as ethylene glycol, 1,2-propylene glycol, 1,3 propane diol, 1,4-butane diol, 1,3 butanediol, 1,6-hexane diol, diethylene glycol, tetramethylene ether glycol, and the like. More than one carboxylic acid or glycol may be used. Some polyester polyols also employ caprolactone and dimerized unsaturated fatty acids in their manufacture.

Useful polyester polyols, polycaprolactone polyols and polycarbonate polyols typically have a number average molecular weight of 200 to 6,000, e.g., from 400 to 3000 or from 1000 to 2500, and again, diols are typically preferred.

In some embodiments, the polyol comprises glycols or triols having molecular weights ranging, for example, from 60 to 400, e.g., from 80 to 300 or from 100 to 200. Such glycols or triols may include, for example, ethylene glycol, isomers of propylene glycol, isomers of butane diol, isomers of pentanediol, isomers of hexanediol, trimethylolpropane, pentaerythritol, diethylene glycol, triethylene glycol, dipropylene glycol, tripropylene glycol, etc.

While almost any polyisocyanate monomer may be used to prepare the prepolymer of the invention, the polyisocyanate monomer typically comprises a di-isocyanate. Examples of common diisocyanates include diphenylmethane diisocyanate (MDI), polymeric MDI, toluene diisocyanate (TDI), para-phenylene diisocyanate (PPDI), diphenyl 4,4'-diisocyanate ("DPDI"), dibenzyl-4,4'-diisocyanate, naphthalene diisocyanate (NDI), benzophenone-4,4'-diisocyanate, 1,3 and 1,4-xylene diisocyanates, tetramethylxylylene diisocyanate (TMXDI), 1,6-hexane diisocyanate (HDI), isophorone diisocyanate (IPDI), 3,3'-bitoluene diisocyanate (TODI), 1,4-cyclohexyl diisocyanate (CHDI), 1,3-cyclohexyl diisocyanate, methylene bis(p-cyclohexyl isocyanate) ($H_{12}MDI$).

The exact polyols and isocyanate monomers used to prepared the prepolymers of the invention will vary depending on the end use of the final product. In some embodiments prepolymers prepared from aromatic isocyanates such as PPDI, MDI, TDI and the like will be preferred, in some embodiments prepolymers prepared from aliphatic isocyanates is such as HDI, $H_{12}MDI$, CHDI and the like will be preferred.

Obviously no attempt is made here to provide an exhaustive list of possible polyols, isocyanate monomers or prepolymers useful for the practice of the invention.

Isocyanate terminated prepolymers are often prepared using an excess of polyisocyanate monomer resulting in a prepolymer mixture containing unreacted monomer, e.g., unreacted or "free" isocyanate monomer. Levels of 20 wt % or more of the free monomer may be encountered. In some embodiments of the present invention, the level of free isocyanate monomer in the prepolymer mixture is at a reduced level, e.g., a "low free" diisocyanate prepolymer having free isocyanate monomer levels of less than 5 wt %, less than 3 wt %, less than 1 wt %, or less than 0.5 wt % can be effectively employed The isocyanate capped polyurethane prepolymer and the alkyl sulfoxide can be combined in any manner to form the composition comprising the prepolymer and alkyl sulfoxide. For example, the alkyl sulfoxide of the invention can simply be added to the prepolymer and mixed. Other components can be present in the composition including solvents and additives common in the art.

The prepolymer/alkyl sulfoxide composition of the invention is stable at temperatures up to 70° C. and often higher for at least 7 days, and in many cases longer, e.g., 1 to four weeks, 1 to 6 months, or longer, depending on conditions of storage. This stable composition is advantageously used in the preparation of polyurethane polymers, especially those prepared by curing the prepolymer with a blocked polyamine curing agent, e.g. a metal salt coordination complex of a polyamine, because while the inventive composition is extremely stable on its own, it is also activated to rapid cure by metal salt/polyamine coordination complexes, such as alkaline metal salt complexes of methylene dianiline. Further, when combined with such a blocked curing agent, the prepolymer of the inventive composition resists cure during processing until the curing temperature is reached making it useful in one pack urethane systems.

As the alkyl sulfoxide can be added to a composition comprising an amine coordination complex curative without causing premature deblocking of the curative, some embodiments of the invention provide a composition comprising i) an isocyanate capped polyurethane prepolymer, ii) from about 0.1 to about 5.0 wt %, typically 0.1 to 2 wt % of an alkyl sulfoxide, based on the combined weight of the prepolymer and alkyl sulfoxide, and iii) a polyamine metal salt coordination complex such as methylenedianiline metal salt coordination complex. The molar ratio of prepolymers to curatives, for example, may be in the range of from 1:2 to 3:1, e.g., from 0.7:1 to 1.2:1 or from 1.1:1 to 0.9:1.

Thus, the invention provides a ready solution to a variety of difficulties related to polyurethanes faced by industry and commerce, especially polyurethanes cured with coordination complex curing agents such as the 3:1 NaCl:MDA complex, e.g., efficiency of curing, storage stability of the prepolymer, storage stability of one pack combinations of prepolymer and curing agent, quality of the final polyurethane, and improved processing and the like.

As discussed above, while there is no shortage of compounds that are listed or suggested in the art as cure accelerators or deblocking agents in reactions between metal salt coordination complexes and polyurethane prepolymers, many have not been tested or exemplified. Presumably some are more effective at accelerating or otherwise improving prepolymer cure than others. Even if the issues related to effective curing of the prepolymer were solved, concerns regarding prepolymer stability and the stability of compositions comprising prepolymer and curing agent would still need to be addressed. For example, prepolymers are typically melted and stored at elevated temperature before being processed into elastomers. Thus, prepolymers should be stable after heat aging for one week at 70° C.

The shelf life of commercially available 'one pack' or 'one-component' polyurethane systems sold as a mixture of polyurethane prepolymer and metal salt complex of methylenedianiline is an obvious area of concern given the potential for premature curing. The presence of a cure accelerator that might also accelerate premature curing below the activation temperature of the curative would make such concerns even more of an issue. As shown in the Examples, one pack compositions comprising the alkyl sulfoxide according to the present invention are more resistant to premature curing than those containing other classes of accelerators.

Aside from processing issues related to extended cure times or high temperature curing, issues related to the quality of a molded polyurethane article can arise from poor stability of a prepolymer/curing agent composition or inefficient cure of the composition. For example, before a prepolymer is cured in a mold, the prepolymer/curing agent composition must spread out and adequately fill the mold. A composition that is overly viscous may not adequately fill the mold, which can become more problematic if the composition must first be heated to temperatures approaching the curing temperature making premature curing more likely. On the other hand, and especially in thicker sections, a composition will typically cure most rapidly where heat is applied, e.g., at the surface of the mold, while the interior cures more slowly. As a result, a hard skin may form on the outer surface of the elastomer initially, and then, as the cure progresses toward the center of the composition, the inner volume of the elastomer may expand, which in turn may cause the skin to crack or rupture and form undesirable surface defects.

That is, in many applications a cure accelerator must be stable in the presence of both prepolymer and curing agent to avoid problems associated with premature curing, but must also exhibit high activity at the cure temperature to avoid problems associated with non-uniform cure.

The present invention addresses all the issues above. Isocyanate capped prepolymers are stable in the presence the alkyl sulfoxide at the concentrations used and such compositions can be can be stored at temperatures typically encountered in industry. This is quite surprising as many of the cure accelerators found in the art destabilize isocyanate capped prepolymers. The prepolymer of the present compositions also cures more rapidly in the presence of metal salt coordination complexes than when the prepolymer is similarly cured in the absence of the alkyl sulfoxide. Significantly, the prepolymer combined with the alkyl sulfoxide of the present invention cures more effectively in the presence of metal salt coordination complexes than when the same prepolymer is combined with other cure accelerators that are found in the art. This combination of prepolymer stability and outstanding cure acceleration seen when an alkyl sulfoxide of the invention is added to a prepolymer is not seen with other cure accelerators.

Compositions comprising a commercially available prepolymer and dimethyl sulfoxide of the invention were compared to similar compositions comprising the same prepolymer and various cure accelerators found in the art for storage stability and curing time.

Three classes of deblocking catalysts for methylenedianiline coordination complexes, MDA-CC, are known in the art. One class is based on active hydrogen compounds, i.e., compounds that react with isocyanate groups such as alcohols primary amines, secondary amines etc., and includes materials such as glycerol and urea. As active hydrogen compounds, U.S. Pat. No. 4,772,676 discloses alcohol catalysts, such as, 1,4-butane diol or phenoxypoly(oxyethylene) ethanol as preferred compounds.

The second class is based on organic salt compounds, such as quaternary ammonium, imidazolium, pyridinium, pyrrolidinium, piperidinium, morpholinium, phosphonium or sulfonium salts. As organic salts useful in deblocking MDA-CC, U.S. Pat. Nos. 8,754,184 and 9,006,375 exemplify various amine salts.

The third class is based on polar aprotic compounds containing polar functional groups. For example, U.S. Pat. No. 3,888,831 lists substituted amides, carbonates, esters, ethers, ketones, alkyl halides, aromatic halides and nitrates, sulfones, sulfoxides, tertiary amines, etc., as deblocking catalysts or cure accelerators with MDA-CC, however, many of these compounds, such as sulfoxides, have never been exemplified as deblocking catalysts. For example, as polar aprotic compounds useful in deblocking MDA/metal salt coordination complexes, U.S. Pat. No. 3,888,831 exemplifies only nitrobenzene, xylene, chlorobenzene, tetra-ethylene glycol bis-2-ethyl hexanoate and dipropylene glycol dibenzoate, and prefers acetone and esters of tetra-ethylene glycol.

Prepolymers are typically melted and stored at elevated temperature before being processed and should be stable to heat aging for one week at 70° C. The deblocking agent must not accelerate decomposition of the prepolymer. DMSO, i.e., dimethyl sulfoxide, and compounds from the three classes of MDA-CC deblocking catalysts described above were tested for their effect on storage stability in compositions comprising polyurethane prepolymer Adiprene Duracast C900, an MDI-terminated polycaprolactone prepolymer having low free MDI content. Compositions were prepared by adding 1.0% by weight of deblocking catalyst to the molten prepolymer at 70° C. After mixing, the compositions were transferred under nitrogen to glass jar, which were sealed and heat aged at 70° C. for one week. Changes in NCO content and viscosity were measured. Results are shown in Table 1. The initial viscosity of the prepolymer was 5300 cP at 50° C.

TABLE 1

Prepolymer NCO and Viscosity Stability

|   | Catalyst | T0 NCO (%) | T168 NCO (%) | Change NCO (%) | T168 viscosity at 50° C. (cP) |
|---|---|---|---|---|---|
| Control | None | 3.597 | 3.515 | −2.28 | 6325 |
|   | Active Hydrogen Compounds | | | | |
| 1 | Urea | 3.504 | 3.244 | −7.42 | 10,263 |
| 2 | 2EHA | 3.461 | 2.906 | −16.03 | 32,300 |
| 3 | Glycerol | 3.388 | Gelled | Gelled | Gelled |
|   | Organic Salts | | | | |
| 4 | QAC | 3.555 | 3.396 | −4.47 | 7513 |
| 5 | Lecithin | 3.536 | 3.345 | −5.40 | 8088 |
|   | Polar Aprotic Compounds | | | | |
| 6 | DMSO | 3.535 | 3.463 | −2.04 | 5863 |
| 7 | PC | 3.545 | 3.460 | −2.40 | 6113 |
| 8 | Sulfolane | 3.544 | 3.444 | −2.82 | 6582 |
| 9 | HMPA | 3.547 | 3.429 | −3.33 | 8038 |
| 10 | Acetone | 3.498 | 3.359 | −3.97 | 6800 |
| 11 | N-Methyl-2pyrrolidone | 3.503 | 3.350 | −4.37 | 7000 |
| 12 | Dimethylacetamide | 3.502 | 2.984 | −14.79 | 14,463 |
| 13 | Tributylamine | 3.231 | 2.500 | −22.62 | 54,000 |
| 14 | DMPU | 3.549 | Gelled | Gelled | Gelled |
| 15 | PEGDME | 3.526 | Gelled | Gelled | Gelled |

2EHA is 2-ethyl hexanoic acid
QAC is Quaternary Ammonium Chloride
PC is 1,2-Propanediol Carbonate
HMPA is Hexamethylphosphoric triamide
DMPU is 1,3-Dimethyl-3,4,5,6-tetrahydro-2-pyrimidinone
PEGDME is Polyethylene glycol dimethyl ether As seen in Table 1, DMSO and PC (2-Propanediol Carbonate) have no measurable negative effect on the % NCO or viscosity of the prepolymer, and the effect of DMSO is possibly beneficial. The negative effect of the active hydrogen compounds on both % NCO and viscosity is significant. Likewise, DMAC, TBA, DMPU and PEGDME show a significantly negative effect. The severe incompatibility of the prepolymer with glycerol, DMPU and PEGDME is evidenced by the gelling observed on storage.

These storage properties are important because the properties of cast elastomers are generally reduced when the NCO of the prepolymer declines greater than about 2%.

To evaluate the above compounds for their impact on curing times, the polyurethane prepolymer ADIPRENE DURACAST C900 was melted at 70° C., and deblocking catalyst was added, either at 0.5 or 1.0 wt % as shown in Table 2, immediately before the sodium chloride/methylene dianiline coordination complex curing agent DURACAST C3-LF was added at an NH2/NCO equivalent ratio of 0.95. After mixing, each composition was charged by syringe to a test cell mounted in a temperature controlled furnace at 50° C. A spindle attached to a viscometer was inserted into the test fluid. The temperature was held at 50° C. for 15 minutes and then ramped to 100° C. according to a set program. Viscosity was measured as a function of time until the mixture reaches 400,000 cP; results are listed in Table 1A. The results using glycerol, DMPU and PEGDME are omitted here due to their storage incompatibility with the prepolymer as shown above. Full details are found in the Examples.

A smaller effect on cure rate was seen for the active hydrogen compounds and organic salts than seen for DMSO. The results for the polar aprotic compounds are listed in order greatest to least impact on cure rate.

Among the polar aprotic compounds DMSO has the greatest activity. PC, which was shown above to produce relatively stable compositions with the prepolymer has only a weak effect on cure rate. Acetone, the compound preferred in U.S. Pat. No. 3,888,831, exhibits only a modest positive effect on cure rate and a moderately negative effect on prepolymer stability.

TABLE 1A

Deblocking Study with Adiprene Duracast C900

| Number | Deblocking Agent | Dipole Moment (D) | Agent Level (pph) | Reaction Time (min.) |
|---|---|---|---|---|
| Control | None | None | None | 15.48 |
|   | Active Hydrogen Compounds/Quaternary Compounds | | | |
| 1 | Urea | 4.38 | 0.50 | 11.93 |
| 2 | 2EHA | <1.5 | 0.50 | 10.68 |
| 4 | QAC | — | 1.00 | 11.82 |
| 5 | Lecithin | — | 1.00 | 11.39 |
|   | Polar Aprotic Compounds | | | |
| 6 | DMSO | 3.96 | 1.00 | 7.50 |
| 6 | DMSO | 3.96 | 0.50 | 9.28 |
| 12 | DMAC | 3.72 | 0.50 | 10.72 |
| 11 | NMP | 4.09 | 0.50 | 10.73 |
| 10 | Acetone | 2.91 | 1.00 | 10.78 |
| 10 | Acetone | 2.91 | 0.50 | 12.36 |
| 9 | HMPA | 5.38 | 0.50 | 12.37 |
| 8 | Sulfolane | 4.35 | 0.50 | 12.39 |
| 7 | PC | 4.94 | 0.50 | 13.47 |
| 13 | Tributylamine | 0.76 | 0.50 | 15.97 |

The data in the above Tables demonstrate the surprising result that DMSO/prepolymer compositions have both excellent chemical stability and high catalytic activity when mixed and cured with MDA-CC. It is also somewhat surprising that there is no simple correlation between dipole moment and deblocking activity.

Glycerol did show excellent activity in cure acceleration, as shown in the Examples. However, the excessive reactivity of glycerol with isocyanate capped prepolymers precludes its use in compositions comprising such prepolymers that stand or are stored for any significant length of time.

Further testing, as detailed in the examples, shows that increasing levels of DMSO lower the curing temperature of the prepolymer and demonstrates the excellent physical properties of the elastomeric polyurethane produced from the inventive composition.

Evidence that the accelerated cure catalyzed by the DMSO may be due to its activity as a deblocking catalyst for the coordination complex may be found in Example 6 as DMSO does not increase the cure rate between the prepolymer and a standard non-blocked aromatic diamine curing agent MOCA. However, this suggested mode of activity is considered a possibility not a proven mechanism.

In some industrial casting operations a day tank is filled with a mixture comprising prepolymer and curing agent in a mixing room and moved to a processing area to fill molds. The viscosity of the mixture must remain low enough to work with and properly fill the molds. In cast elastomer processing workable viscosity for hand batching is typically <20,000 cP. The inventive composition, when blended with a metal salt/polyamine coordination complex curative, is stable to industrial processing conditions, allowing plenty of time for processing steps despite its increased cure rate.

For example, a composition comprising Adiprene Duracast C900 and 0.5 wt % of DMSO, based on the combined weight of prepolymer and DMSO was mixed under nitrogen with sodium chloride/methylene dianiline ($NH_2$/NCO equivalent ratio=0.95) at 50° C. in a reactor equipped with an agitator, electric heat jacket and temperature controller. Samples were taken periodically and viscosity was measured as a function of mixing time. After the first hour the viscosity at 55° C. was 4063 cP, after 4 hours the viscosity at 55° C. was 6638 cP and after 24 hours the viscosity at 55° C. had risen to only 8313 cP, well within the workable viscosity range.

The composition of the invention comprising an isocyanate capped prepolymer and a minor amount of DMSO is surprisingly storage stable and, when blended with a metal salt/polyamine coordination complex, exhibits a significant increase in cure rate, which increase is unexpectedly more pronounced when compared with many other compounds disclosed by the art as cure accelerators/deblocking agents.

EXAMPLES

The following examples illustrate the unique properties of the alkyl sulfoxide/PUR prepolymer compositions of the invention in comparison to a Control, i.e., a composition without a cure accelerator, and compositions comprising other compounds disclosed as deblocking agents/cure accelerators for curing PUR prepolymers with polyamine metal salt coordination complexes. In the Examples the alkyl sulfoxide of the invention is dimethyl sulfoxide, Organic Salts, and Polar Aprotic Compounds as shown in the tables.

Example 1

Heat Stability of PUR Prepolymer/Deblocking Agent Blends

Adiprene Duracast C900, an MDI-terminated polycaprolactone prepolymer, was melted at 70° C. and charged to a mixing cup. Deblocking agent/cure accelerator compound, 1.0% by weight, was added, the mixing cup was placed in a FlackTek mixer and the resulting composition was mixed for one minute at 2300 rpm. The blend was charged to a 8 ounce glass jar, sealed under nitrogen and heat aged at 70° C. in a dry storage container for one week. The initial and final NCO and final viscosity were measured. The initial viscosity of the prepolymer was 5300 cP at 50° C. The fresh and heat aged blends were cured with Duracure C3-LF to measure the effect of heat aging on elastomer hardness.

The results are shown in Table 2 and show that that DMSO has no measurable negative effect on the NCO, viscosity and hardness stability of the prepolymer.

TABLE 2

Prepolymer NCO, Viscosity @ 50° C., and Hardness Stability

|   | Catalyst | % NCO T0 | % NCO T168 | % NCO Change | Viscosity T168 | Hardness T0 | Hardness T168 |
|---|---|---|---|---|---|---|---|
| | | Control | | | | | |
| Control | None | 3.597 | 3.515 | −2.28 | 6325 | 90A | 90A |
| | | Active Hydrogen Compounds | | | | | |
| 1 | Urea | 3.504 | 3.244 | −7.42 | 10,263 | 90A | 87A |
| 2 | 2EHA | 3.461 | 2.906 | −16.03 | 32,300 | 90A | 76A |
| 3 | Glycerol | 3.388 | Gelled | Gelled | Gelled | Gelled | Gelled |
| | | Organic Salts | | | | | |
| 4 | QAC | 3.555 | 3.396 | −4.47 | 7513 | 90A | 88A |
| 5 | Lecithin | 3.536 | 3.345 | −5.40 | 8088 | 90A | 88A |
| | | Polar Aprotic Compounds | | | | | |
| 6 | DMSO | 3.535 | 3.463 | −2.04 | 5863 | 90A | 90A |
| 7 | PC | 3.545 | 3.460 | −2.40 | 6113 | 90A | 88A |
| 8 | Sulfolane | 3.544 | 3.444 | −2.82 | 6582 | 90A | 87A |
| 9 | HMPA | 3.547 | 3.429 | −3.33 | 8038 | 90A | 87A |
| 10 | Acetone | 3.498 | 3.359 | −3.97 | 6800 | 87A | 87A |
| 11 | N-Methyl-2pyrrolidone | 3.503 | 3.350 | −4.37 | 7000 | 90A | 88A |
| 12 | Dimethylacetamide | 3.502 | 2.984 | −14.79 | 14,463 | 90A | 85A |
| 13 | Tributylamine | 3.231 | 2.500 | −22.62 | 54,000 | 89A | 70A |
| 14 | DMPU | 3.549 | Gelled | Gelled | Gelled | 90A | Gelled |
| 15 | PEGDME | 3.526 | Gelled | Gelled | Gelled | 90A | Gelled |

2 EHA stands for 2-ethyl hexanoic acid
QAC stands for Quaternary Ammonium Chloride
PC stands for 1,2-Propanediol Carbonate
HMPA stands for Hexamethylphosphoric triamide
DMPU stands for 1,3-Dimethyl-3,4,5,6-tetrahydro-2-pyrimidinone
PEGDME stands for Polyethylene glycol dimethyl ether

Example 2

Curing of PUR Prepolymer/Deblocking Agent Blends

The deblocking agent/cure accelerator compounds from Example 1 were screened for deblocking activity. Adiprene Duracast C900 was melted, charged to a mixing cup and equilibrated to 50° C. Deblocking agent, if used, was blended with the prepolymer immediately before adding the MDA-CC curing agent Duracast C3-LF, approximately 44% tris(4,4'-diaminodiphenylmethane) sodium chloride in dioctyl adipate. Duracast C3-LF was drawn into a syringe and weighed, such that the $NH_2$/NCO equivalent ratio=0.95, and charged to the prepolymer. The resulting formulation was mixed in a FlackTek mixer one minute at 2300 rpm and then charged by syringe to a test cell that was mounted in a temperature controlled furnace at 50° C. A spindle was attached to the viscometer and inserted into the test fluid. A temperature program was initiated that soaks the mixture for 15 minutes at 50° C. and then ramps the temperature to 100° C. Viscosity was measured as a function of time. The reaction time is the time it takes the mix to reach 400,000 cP. The results are listed in Table 3.

TABLE 3

Deblocking Study with Adiprene Duracast C900

| Number | Deblocking Agent | Dipole Moment (D) | Agent Level (pph) | Reaction Time (min.) |
|---|---|---|---|---|
| Control | | | | |
| Control | None | None | None | 15.48 |
| Active Hydrogen Compounds | | | | |
| 3 | Glycerol | 2.56 | 0.10 | 9.03 |
| 2 | 2EHA | <1.5 | 0.50 | 10.68 |
| 1 | Urea | 4.38 | 0.50 | 11.93 |
| Organic Salts | | | | |
| 5 | Lecithin | — | 1.00 | 11.39 |
| 4 | QAC | — | 1.00 | 11.82 |
| Polar Aprotic Compounds | | | | |
| 6 | DMSO | 3.96 | 1.00 | 7.50 |
| 6 | DMSO | 3.96 | 0.75 | 8.52 |
| 6 | DMSO | 3.96 | 0.50 | 9.28 |
| 6 | DMSO | 3.96 | 0.25 | 9.77 |
| 14 | DMPU | 4.17 | 1.00 | 10.03 |
| 14 | DMPU | 4.17 | 0.50 | 11.75 |
| 12 | Dimethylacetamide | 3.72 | 0.50 | 10.72 |
| 11 | N-Methyl-2-pyrrolidone | 4.09 | 0.50 | 10.73 |
| 15 | PEGDME | — | 0.50 | 11.85 |
| 10 | Acetone | 2.91 | 1.00 | 10.78 |
| 10 | Acetone | 2.91 | 0.50 | 12.36 |
| 9 | HMPA | 5.38 | 0.50 | 12.37 |
| 8 | Sulfolane | 4.35 | 0.50 | 12.39 |
| 7 | PC | 4.94 | 0.50 | 13.47 |
| 13 | Tributylamine | 0.76 | 0.50 | 15.97 |

Among the polar aprotic compounds DMSO exhibits the greatest activity. Unexpectedly, there is no simple correlation between dipole moment and deblocking activity. Surprisingly, DMSO/prepolymer compositions have both excellent chemical stability and high catalytic activity when mixed and cured with MDA-CC.

Example 3

Alkyl Sulfoxide Activity in Lowering Deblocking Temperature

The following demonstrates the utility of the deblocking catalyst in lowering the deblocking temperature. Adiprene Duracast C900 was melted, charged to a mixing cup and equilibrated to 50° C. Deblocking agent, if used, was blended with the prepolymer immediately before adding Duracast C3-LF. Duracast C3-LF was drawn into a syringe and weighed, such that the $NH_2$/NCO equivalent ratio=0.95, and charged to the prepolymer. The resulting formulation was mixed in a FlackTek mixer one minute at 2300 rpm and then charged by syringe to a test cell that was mounted in a temperature controlled furnace at 50° C. The spindle was attached to the viscometer and inserted into the test fluid. A program was initiated that soaks the mixture for 15 minutes at 50° C. and then ramps the test cell to the appropriate temperature. Viscosity was measured as a function of time. The deblock time is the time it takes the mix to reach 400,000 cP. The deblocking results are listed in Table 4.

TABLE 4

Deblocking Catalyst vs. Deblocking Temperature

| Catalyst Type | Catalyst Level (pph) | Deblock Temp. (° C.) | Reaction Time (min.) |
|---|---|---|---|
| None | None | 100 | 15.43 |
| None | None | 100 | 14.46 |
| None | None | 110 | 10.54 |
| None | None | 120 | 8.93 |
| None | None | 140 | 7.25 |
| Control | None | 100 | 15.48 |
| DMSO | 0.25 | 100 | 9.77 |
| DMSO | 0.50 | 100 | 9.28 |
| DMSO | 0.75 | 100 | 8.52 |
| DMSO | 1.00 | 100 | 7.50 |

As seen in Table 4, increasing the deblocking catalyst level provides the same effect on curing rate as increasing the curing temperature. The use of the deblocking catalyst has the benefit of decreasing the cycle time of the molding process, which is particularly useful when casting thick parts.

Example 4

Stability of Prepolymer/MDA-CC/Alkyl Sulfoxide Mixtures

The following demonstrates the storage stability of the Duracast C900/Duracure C3-LF/deblocking catalyst mixtures. In cast elastomer processing workable viscosity for hand batching is typically <20,000 cP.

Adiprene Duracast C900 was melted, charged to a reactor equipped with an agitator attached to a mixing motor, electric heat jacket and temperature controller. The prepolymer was equilibrated to 50° C. Deblocking agent, if used, was blended into the prepolymer. Duracast C3-LF was weighted and added to the vessel, such that the $NH_2$/NCO equivalent ratio=0.95. The mixture was degassed for 15 minutes under vacuum. The vacuum was released with dry nitrogen. Samples were taken using a syringe and viscosity was measured as a function of mixing time using a Brookfield viscometer. The results are listed in Table 5 and show that the C900/C3-LF/DMSO mixture remains workable even after 24 hours of mixing in a vessel. This finds utility in casting operations where a day tank is filled in a mixing room and moved to a processing area to fill molds.

TABLE 5

Mix Viscosity as a Function of Time

| PP Viscosity at 55° C. (cP) | Catalyst Type | Catalyst Level (pph) | Mixing Temp. (° C.) | Sample Time (hours) | Mix Viscosity at 55° C. (cP) |
|---|---|---|---|---|---|
| 4413 | DMSO | 0.5 | 50 | 0 | 4063 |
|  |  |  |  | 1 | 5863 |
|  |  |  |  | 2 | 6688 |
|  |  |  |  | 4 | 6638 |
|  |  |  |  | 24 | 8313 |
| 4413 | None | None | 50 | 0 | 4088 |
|  |  |  |  | 1 | 3988 |
|  |  |  |  | 2 | 3963 |
|  |  |  |  | 4 | 3963 |
|  |  |  |  | 24 | 3925 |

Example 5

Physical Properties of PUR Formed with and without DMSO

Adiprene Duracast C900 was cured with Duracast C3-LF with and without DMSO. Physical properties were measured. Adiprene Duracast C900 was melted, charged to a mixing cup and equilibrated to 70° C. Deblocking agent, if used, was blended with the prepolymer immediately before adding Duracast C3-LF. Duracast C3-LF was drawn into a syringe and weighed, such that the $NH_2$/NCO equivalent ratio=0.95. The C3-LF was charged to the prepolymer. The mixing cup was placed in a FlackTek mixer and mixed for one minute at 2300 rpm. The mix was poured into pocket and button molds and molded using the conditions listed in Table 6. Tensile properties were measured using ASTM D 412. Trouser tare strength were measured using ASTM D 624. The results are listed in Table 6 and show that excellent physical properties are obtained by elastomers made with and without the use of DMSO deblocking catalyst.

TABLE 6

Physical Testing Results

| Prepolymer | C900 | C900 | C900 | C900 |
|---|---|---|---|---|
| Curative | C3-LF | C3-LF | C3-LF | C3-LF |
| Stoich. (%) | 95 | 95 | 95 | 95 |
| DMSO Level (pph) | None | None | 0.5 | 0.5 |
| Mold Temp. (° C.) | 100 | 120 | 100 | 120 |
| Post Cure Temp. (° C.) | 140 | 140 | 140 | 140 |
| Post Cure Time (hr.) | 24 | 24 | 24 | 24 |
| Property |  |  |  |  |
| Hardness, Shore A | 90 | 90 | 90 | 90 |
| Modulus at 10% (psi) | 454 | 432 | 458 | 427 |
| Modulus at 100% (psi) | 1129 | 1109 | 1082 | 1034 |
| Modulus at 300% (psi) | 1447 | 1439 | 1418 | 1381 |
| Elongation at Break (%) | 652 | 669 | 647 | 665 |
| Tensile at Break (psi) | 6907 | 7074 | 6742 | 6736 |

TABLE 6-continued

Physical Testing Results

| Trouser Tear (pli) | 334 | 330.5 | 312 | 391 |
|---|---|---|---|---|
| Appearance | Off-white | Off-white | Off-white | Off-white |

Example 6

Curing of Prepolymer/Free Amine Curative/Alkyl Sulfoxide Composition

The following example demonstrates that DMSO does not accelerate the amine/isocyanate reaction. Adiprene Duracast C900 (EW=1177 g/eq) was melted, charged to a mixing cup and equilibrated to 50° C. DMSO, if used, was blended with the prepolymer before adding 4,4'-methylene-bis(2-chloroaniline)(MOCA). MOCA (EW=133.5 g/eq) was melted, drawn into a syringe, weighed, equilibrated in an oven at 115° C. and charged to the prepolymer. The mixing cup was placed in a FlackTek mixer and mixed for one minute at 2300 rpm. The timer was started simultaneously when the mixer was started. The mix was charged by syringe to a test cell that was mounted in a temperature controlled furnace at 50° C. A spindle was inserted into the mix and the viscosity was measured as a function of time. The time to reach 400,000 cP is listed in Table 7.

TABLE 7

C900/MOCA Cure Test

| Material | Control | Treatment |
|---|---|---|
| C900 | 100 | 100 |
| DMSO | 0 | 1.0 |
| MOCA | 10.7 | 10.7 |
| NH2/NCO eq ratio | 0.95 | 0.95 |
| Time to 400,000 cP (min.) | 21.0 | 24.4 |

The results in Table 7 show that DMSO does not accelerate the amine/isocyanate reaction and demonstrate that DMSO is likely a MDA-CC deblocking catalyst.

What is claimed is:

1. A method of preparing a polyurethane elastomer, the method comprising the steps of:
   i) adding dimethyl sulfoxide to an isocyanate terminated prepolymer formed by reaction of one or more diisocyanate monomers selected from the group consisting of diphenylmethane diisocyanate, toluene diisocyanate and para-phenylene diisocyanate, with one or more polyols selected from the group consisting of polyether polyol, polyester polyol and polycaprolactone polyol; to form a prepolymer composition comprising from 0.1 to 1.5 wt % dimethyl sulfoxide based on the combined weight of the prepolymer and dimethyl sulfoxide,
   ii) storing the prepolymer composition formed in step i) at temperatures in the range from 20° C. to 70° C. for at least 168 hours
   iii) combining the prepolymer composition of step ii) with a polyamine metal salt coordination complex to form a curable composition, and
   iv) heating the curable composition to effect cure.

2. The method according to claim 1, wherein the dimethyl sulfoxide is present at from about 0.25 to about 1.0 wt %, based on the combined weight of the prepolymer and the dimethyl sulfoxide.

* * * * *